US 6,576,051 B2

(12) United States Patent
Bardman et al.

(10) Patent No.: US 6,576,051 B2
(45) Date of Patent: Jun. 10, 2003

(54) POLYMER-PIGMENT COMPOSITES

(75) Inventors: James Keith Bardman, Green Lane, PA (US); Ward Thomas Brown, North Wales, PA (US); Kenneth Michael Donnelly, Bensalem, PA (US); Wei Zhang, Maple Glen, PA (US); Bernhard Helmut Lieser, San Pedro, CA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/993,262

(22) Filed: Nov. 14, 2001

(65) Prior Publication Data

US 2002/0096088 A1 Jul. 25, 2002

Related U.S. Application Data

(60) Provisional application No. 60/252,275, filed on Nov. 21, 2000.

(51) Int. Cl.⁷ .................................................. C09C 1/36
(52) U.S. Cl. ...................... 106/436; 106/427; 106/443; 106/462; 106/503
(58) Field of Search ................................ 106/427, 436, 106/443, 462, 503

(56) References Cited

U.S. PATENT DOCUMENTS

| | | | |
|---|---|---|---|
| 4,158,736 A | | 6/1979 | Lewis et al. |
| 4,506,057 A | | 3/1985 | Greene et al. |
| 4,733,005 A | | 3/1988 | Schmidt et al. |
| 4,997,864 A | * | 3/1991 | Waters ........................ 523/319 |
| 5,191,029 A | | 3/1993 | DelDonno |
| 5,268,197 A | | 12/1993 | Pons et al. |
| 5,324,879 A | | 6/1994 | Hawthorne |
| 5,362,826 A | | 11/1994 | Berge et al. |
| 5,385,960 A | * | 1/1995 | Emmons et al. ............ 523/200 |
| 5,412,019 A | | 5/1995 | Roulstone et al. |
| 5,509,960 A | | 4/1996 | Simpson et al. |
| 5,534,585 A | | 7/1996 | Roulstone et al. |
| 5,554,215 A | | 9/1996 | Simpson et al. |
| 5,643,974 A | | 7/1997 | Simpson et al. |
| 5,710,227 A | | 1/1998 | Freeman et al. |
| 5,869,559 A | | 2/1999 | Simpson et al. |
| 5,952,404 A | | 9/1999 | Simpson et al. |
| 6,080,802 A | | 6/2000 | Emmons et al. |
| 6,214,467 B1 | * | 4/2001 | Edwards et al. ......... 427/385.5 |

FOREIGN PATENT DOCUMENTS

WO    WO99/25780 A1    5/1999

* cited by examiner

*Primary Examiner*—C. Melissa Koslow
*Assistant Examiner*—Shalie Manlove
(74) *Attorney, Agent, or Firm*—Gary D. Greenblatt

(57) ABSTRACT

Composite particles and a method of preparing the composite particles are provided. The composite particles contain titanium dioxide particles with adsorbed two-phase polymer particles. The two-phase polymer particles have a soft polymer phase and a hard polymer phase in which the weight ratio of the hard polymer phase to the soft polymer phase is in the range of 10:1 to 1:5. The composite particles containing the two-phase polymer particles have improved aqueous stability and provide coatings with improved scrub resistance.

14 Claims, No Drawings

POLYMER-PIGMENT COMPOSITES

CROSS REFERENCE TO RELATED PATENT APPLICATIONS

This is a non-provisional application of prior pending U.S. provisional application serial No. 60/252,275 filed Nov. 21, 2000.

This invention relates to polymer-pigment composite particles. In particular, this invention relates to composite particles containing pigment particles and polymer particles which contain two polymer phases. Further, this invention relates to a process of preparing the composite.

Titanium dioxide is the pigment of choice by most coatings manufacturers, particularly paint manufacturers, to provide whiteness and opacity or "hiding" to the final dried coating. Titanium dioxide is typically the most expensive raw material in a coating formulation. Thus, paint manufacturers have long sought to achieve the desired opacity by using the smallest amount of titanium dioxide possible. A number of techniques have been employed, including:

(1) using titanium dioxide that has an optimal average particle size and particle size distribution for light scattering;

(2) using titanium dioxide that is well dispersed.

The opacifying capability or hiding power of a coating or paint is a function of the spacing of the titanium dioxide particles in the dried coating. The light scattering characteristics of titanium dioxide particles are well known and the average size and size distribution of the titanium dioxide have been optimized by the titanium dioxide manufacturers for maximum scattering. Maximum light scattering occurs when the titanium dioxide pigment particles have a diameter of 200–250 nanometers (nm) and are spaced apart from each other, on the order of a few particle diameters, so that there is minimal interference between the light scattering of neighboring particles.

In an effort to achieve the proper spacing of the pigment particles, titanium dioxide manufacturers have attempted a number of techniques, including encapsulating titanium dioxide particles with a variety of different polymers (either fully in the form of a coating or partially in the form of nodules) or adsorbing a variety of different materials, including polymers (either film forming or non-film forming), to the surface of the titanium dioxide particles. U.S. Pat. No. 5,385,960 discloses an aqueous dispersion of composite particles, the composite particles each including a plurality of selected polymeric latex particles adsorbed to a titanium dioxide particle. The selected polymeric latex particles, which have at least one dihydrogen phosphate functional group, provide spacing between the titanium dioxide particles in films to increase the light scattering of the titanium dioxide particles. U.S. Pat. No. 5,385,960 also discloses that the aqueous dispersion of composite particles must include dibasic phosphate to inhibit a continued increase in the viscosity of the aqueous dispersion. However, the addition of the dibasic phosphate may adversely affect the corrosion resistance of metal coatings containing the composite particles. Further, it is desired that the coatings, which contain the composite particles, have increased levels of scrub resistance, an important property for coatings such as paints.

Coatings containing composites must provide a balance of properties including optical properties such as hiding and gloss, and mechanical properties such as scrub resistance. The composite must have good aqueous stability to allow storage and formulation of the composite, and formulations prepared from the composite. There is a continuing need to improve the scrub resistance of coatings prepared from coating formulations including composites while maintaining the aqueous stability of the composite containing coating formulation. The inventors have found that composites containing polymer particles which are characterized as having two polymer phases, provide a combination of dispersions of composite particles with aqueous stability and coatings with improved scrub resistance.

The present invention provides a composition having composite particles, the composite particles each include at least one two-phase polymer particle adsorbed to a titanium dioxide particle. The two-phase polymer particle contains two polymer phases in which the difference in the glass transition temperatures of the two phases is 10° C. or greater. These two-phase polymer particles are useful for providing titanium dioxide containing composites which are stable as aqueous dispersions and when dried, coatings including the titanium dioxide composites which have improved scrub resistance. The present invention also provides a method of preparing the composite particles.

The first aspect of this invention provides a composition including at least one composite particle; wherein the composite particle comprises a titanium dioxide particle and two-phase polymer particles adsorbed on the surface of the titanium dioxide particle; wherein the composite particle is formed in an aqueous mixture containing at least one titanium dioxide particle, a multiplicity of the two-phase polymer particles, and optionally, dispersant, and the weight ratio of the multiplicity of the two-phase polymer particles to at least one titanium dioxide particle in the aqueous mixture is in the range of 1:20 to 1:2; wherein each of the two-phase polymer particles includes a soft polymer phase with a glass transition temperature less than or equal to 40° C., and a hard polymer phase with a glass transition temperature greater than 40° C.; wherein the difference between the glass transition temperature of the hard polymer phase and the soft polymer phase is at least 10° C.; wherein the average weight ratio of the hard polymer phase to the soft polymer phase is in the range of 10:1 to 1:5; and wherein each of the two-phase polymer particles includes at least one element selected from: at least one phosphorus functional monomer as a polymerized group, at least 5 weight % of at least one carboxylic acid monomer as a polymerized group, based on weight of the two-phase polymer particles, at least one acid macromonomer as a polymerized group, and a water soluble polymer chemically bonded to the two-phase polymer particles wherein the water soluble polymer has a molecular weight of at least 1500 prior to bonding to the two-phase polymer particles and contains at least one moiety adsorbable to the titanium dioxide particle; or the two-phase polymer particles and the titanium dioxide particle have opposite charges.

In the second aspect of this invention, a process is provided for preparing a stable aqueous dispersion of composite particles including the steps of: dispersing titanium dioxide particles in a first aqueous medium; preparing a dispersion or suspension of two-phase polymer particles in a second aqueous medium, wherein the two-phase polymer particles comprise: a soft polymer phase with a glass transition temperature less than or equal to 40° C., and a hard polymer phase with a glass transition temperature greater than 40° C., wherein the difference between the glass transition temperature of the hard polymer phase and the soft polymer phase is at least 10° C., wherein the average weight ratio of the hard polymer phase to the soft polymer phase is in the range of 10:1 to 1:5, and wherein each of the two-phase polymer particles includes at least one element selected from the group consisting of: at least one phosphorus functional monomer as a polymerized group, at least 5 weight % of at least one carboxylic acid monomer as a polymerized group, based on weight of the two-phase polymer particles, at least one acid macromonomer as a polymerized group, and a water soluble polymer chemically bonded to the two-phase polymer particles wherein the water soluble polymer has a molecular weight of at least 1500 prior to bonding to the two-phase polymer particles and contains at least one moiety adsorbable to the titanium dioxide particle; or the two-phase polymer particles and the titanium dioxide particle have opposite charges; preparing a mixture containing the first aqueous medium, the second aqueous medium, and optionally, dispersant, wherein the average weight ratio of the two-phase polymer particles to the titanium dioxide particles is in the range of 1:20 to 1:2; and permitting adsorption of the two-phase polymer particles to the titanium dioxide particles to form the stable aqueous dispersion of composite particles.

The composition containing the composite particles may be used in preparing formulated aqueous compositions, such as coating compositions, paints, and inks, which show good aqueous dispersion stability, such as good viscosity stability or enhanced resistance to flocculation during preparation and storage compared to composite particles not including the two-phase polymer particles. These coating compositions may be dried to give coatings which show improved resistance to scrub but also retain the enhancement in hiding obtained with composite containing coatings. In addition, one or more benefits in a variety of coatings application properties, including gloss, thickener efficiency, slurry compatibility, flow and leveling, color acceptance, color float, syneresis, whiteness, metal marring resistance, and water spot resistance may be provided.

As used herein, the term "(meth)acrylate" refers to either acrylate or methacrylate and the term "(meth)acrylic" refers to either acrylic or methacrylic.

"Glass transition temperature" or "$T_g$" as used herein, means the temperature at or above which a glassy polymer will undergo segmental motion of the polymer chain. Glass transition temperatures of a polymer can be estimated by the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $W_1$ and $W_2$ refer to the weight fraction of the two comonomers, and $T_{g(1)}$ and $T_{g(2)}$ refer to the glass transition temperatures of the two corresponding homopolymers in degrees Kelvin. For polymers containing three or more monomers, additional terms are added ($W_n/T_{g(n)}$). The $T_g$ of a polymer phase can also be calculated by using the appropriate values for the glass transition temperatures of homopolymers, which may be found, for example, in "Polymer Handbook", edited by J. Brandrup and E. H. Immergut, Interscience Publishers. The values of $T_g$ reported herein are calculated based on the Fox equation.

The composition of this invention contains at least one composite particle wherein each composite particle includes a titanium dioxide particle and at least one two-phase polymer particle. The two-phase polymer particle is adsorbed to the titanium dioxide particle and minimizes aggregation of the titanium dioxide particles in aqueous medium by preventing contact between titanium dioxide particles. Composites including the two-phase polymer particles have improved dispersion stability and also may provide coatings with good optical properties such as hiding, opacity, or color, and with improved scrub resistance.

A key aspect of the present invention is the two-phase polymer particles. These polymer particles have at least two polymer phases. One polymer phase is referred to herein as the "soft polymer phase" and has a glass transition temperature less than or equal to 40° C. The other polymer phase is referred to herein as the "hard polymer phase" and has a glass transition temperature greater than 40° C. Further the two polymer phases must have a difference in their glass transition temperatures of at least 10° C. The ratio of the weight of the hard polymer phase to the weight of the soft polymer phase in the two-phase polymer particle is in the range of 10:1 to 1:5.

The two-phase polymer particle may also contain more than two phases. However, if there are two or more phases with glass transition temperatures greater than 40° C., these two or more phases will be considered collectively as the hard polymer phase. Likewise, if there are two or more phases with glass transition temperatures less than or equal to 40° C., these two or more phases will be considered collectively as the soft polymer phase. In a two-phase polymer particle with three or more phases, at least one hard phase and at least one soft phase must have a difference in their glass transition temperatures of at least 10° C.

The two-phase polymer particles also have chemical groups which promote adsorption to the titanium dioxide particle to form a stable composite, or alternatively, the two-phase polymer particles have an opposite charge from the titanium dioxide particle. These chemical groups, or alternatively, the attraction between the opposite charges of the two-phase polymer particle and the titanium dioxide particle provide the two-phase polymer particles with an affinity to associate with the titanium dioxide particle and to remain associated with the titanium dioxide particle. The association may be reversible or irreversible and includes chemical bonding such as covalent bonding and ionic bonding, van der Waals attraction, and steric stabilization. The composite particle formed by the association between the two-phase polymer particles and the titanium dioxide particle must be sufficiently strong to provide composite particles which do not separate into two-phase polymer particles and titanium dioxide particles when used as a component in a formulation.

Suitable morphologies for the two-phase polymer particle include core-shell polymers in which the soft polymer phase fully encapsulates the hard polymer phase. Alternatively, the two-phase polymer particle may have a shell phase which does not fully encapsulate the core phase such as an "acorn" morphology in which either the hard polymer phase or the soft polymer phase may be the shell phase which partially encapsulates the other phase forming the core phase. The two-phase polymer particle may also have a "dipole" morphology in which each phase forms separate but connected lobes, or a particle containing a hard polymer phase hemisphere and a soft polymer phase hemisphere. The two-phase polymer particle may have a morphology in which the hard phase forms multiple domains within the soft polymer phase. Another suitable morphology is a two-phase polymer particle in which one phase forms multiple domains on the surface of the other polymer phase. The two-phase polymer particle may be spherical or may have a non-spherical shape such as an ellipsoid or a rod-like shape. Preferably the two-phase polymer particle is spherical. The chemical group which provides adsorption to the titanium dioxide particle is preferably at or near the surface of the two-phase polymer particle to provide maximum interaction with the titanium dioxide particle. The chemical group which provides adsorption may be in either the hard polymer phase or the soft polymer phase.

The two-phase polymer particles useful in the composition of the present invention may be prepared from a wide range of polymerizable monomers, such as, for example, monoethylenically unsaturated monomers, including α,β-monoethylenically unsaturated monomers such as alkyl acrylates and methacrylates. Suitable monomers include styrene, butadiene, α-methyl styrene, vinyl toluene, vinyl naphthalene, ethylene, propylene, vinyl acetate, vinyl versatate, vinyl chloride, vinylidene chloride, acrylonitrile, methacrylonitrile, (meth)acrylamide, various $C_1$–$C_{40}$ alkyl esters of (meth)acrylic acid; for example, methyl (meth)acrylate, ethyl (meth)acrylate, n-butyl (meth)acrylate, isobutyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, n-amyl (meth)acrylate, neopentyl (meth)acrylate, cyclopentyl (meth)acrylate, lauryl (meth)acrylate, oleyl (meth)acrylate, palmityl (meth)acrylate, and stearyl (meth)acrylate; other (meth)acrylates such as isobornyl (meth)acrylate, benzyl (meth)acrylate, phenyl (meth)acrylate, 2-bromoethyl (meth)acrylate, 2-phenylethyl (meth)acrylate, and 1-naphthyl (meth)acrylate, alkoxyalkyl (meth)acrylate, such as ethoxyethyl (meth)acrylate, mono-, di-, trialkyl esters of ethylenically unsaturated di- and tricarboxylic acids and anhydrides, such as ethyl maleate, dimethyl fumarate, trimethyl aconitate, and ethyl methyl itaconate. The ethylenically unsaturated monomer may also include at least one multiethylenically unsaturated monomer effective to raise the molecular weight and crosslink the two-phase polymer particle. Examples of multiethylenically unsaturated monomers that may be used include allyl (meth)acrylate, tripropylene glycol di(meth)acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, and divinyl naphthalene.

Other types of polymerizable monomers include functional monomers which may be included as polymerized units in the two-phase polymer particles useful in the composites of this invention, depending on the ultimate application for which the product produced by the process of the present invention is intended. For example, small amounts of adhesion-promoting polymerizable monomers can also be included. Examples of other types of functional monomers include hydroxy-functional monomers such as, 2-hydroxyethyl (meth)acrylate, amino-functional monomers, such as glycidyl (meth)acrylate, (meth)acrylamide, substituted (meth)acrylamide such as diacetone (meth)acrylamide, acetoacetoxyethyl (meth)acrylate, acrolein, methacrolein, dicyclopentadienyl (meth)acrylate, dimethyl metaisopropenyl benzyl isocyanate, isocyanato ethyl methacrylate, N-vinyl pyrrolidone, N,N'-dimethylamino(meth)acrylate, and polymerizable surfactants, including, but not limited to, Trem LF-40 (Henkel Corporation). Methyl cellulose and hydroxyethyl cellulose may be included in the polymerization mixture.

The ethylenically unsaturated monomers are chosen for the hard polymer phase and the soft polymer phase to provide the properties required in the intended application and to provide a hard polymer phase with a Tg greater than 40° C. and a soft polymer phase with a Tg equal to or less than 40° C., wherein the difference in the Tg's of the hard and soft polymer phase is at least 10° C. The Tg of a polymer phase is calculated using the Fox Tg equation.

The two-phase polymer particles may adsorb to the titanium dioxide particle, by attractive interactions such as by covalent bonding, ionic bonding, attraction between opposite charges on the two-phase polymer particles and the titanium dioxide particle, steric forces, or van der Waals's forces. The attachment of the two-phase polymer particles to the titanium dioxide particle must be strong enough to form composite particles which are colloidily stable in aqueous medium and wherein the two-phase polymer particles do not desorb from the titanium dioxide particle in the presence of other components and in different conditions, especially components and conditions encountered in the manufacture, storage, and use of water-borne coatings.

In one embodiment, the two-phase polymer particles include as chemical groups which provide adsorption to the titanium dioxide particle, phosphorus containing groups such as phosphates and phosphonates. The two-phase polymer particles with phosphorus containing groups may be prepared by polymerization of a mixture of ethylenically unsaturated monomers including phosphorus functional monomers. Suitable phosphorus functional monomers include dihydrogen phosphate-functional monomers. Examples of dihydrogen phosphate-functional monomers include dihydrogen phosphate esters of an alcohol in which the alcohol also contains a polymerizable vinyl or olefinic group, such as allyl phosphate, mono- or diphosphate of bis(hydroxy-methyl) fumarate or itaconate, derivatives of (meth)acrylic acid esters, such as, for examples phosphates of hydroxyalkyl(meth)acrylates including 2-hydroxyethyl (meth)acrylate, 3-hydroxypropyl (meth)acrylates, and the like. Other suitable phosphorus functional monomers are phosphonate functional monomers, disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid and alkali metal and other salts thereof. Further suitable phosphorus functional monomers are 1,2-ethylenically unsaturated (hydroxy)phosphinylalkyl (meth)acrylate monomers, disclosed in U.S. Pat. No. 4,733,005, and include (hydroxy)phosphinylmethyl methacrylate.

Preferred phosphorus functional monomers are dihydrogen phosphate monomers which include:
$CH_2=C(CH_3)CO_2CH_2CH_2OPO(OH)_2$
$CH_2=C(CH_3)CO_2CH_2CH[OPO(OH)_2]CH_3$
$CH_2=C(CH_3)CO_2CH_2CH_2CH_2OPO(OH)_2$
and $CH_2=C(CH_3)CO_2CH_2CHOHCH_2OPO(OH)_2$
and the corresponding acrylates.

The two-phase polymer particles may contain phosphorus functional monomer at levels in the range of 0.1 to 10 weight %, preferably from 0.5 to 5 weight %, and more preferably from 1 to 3 weight %, based on the weight of the two-phase polymer particles, as a chemical group which provides adsorption to the titanium dioxide particle.

Alternatively, the two-phase polymer particles may be prepared by polymerization and subsequently functionalized to give phosphorus functional groups such as dihydrogen phosphate functional groups. For example, two-phase polymer particles containing amine functionality may be reacted under basic conditions with a compound including both epoxy and phosphate functional groups. Similarly, two-phase polymer particles containing epoxide functionality may be reacted with a compound including both phosphate and amine groups. The two-phase polymer particles which are functionalized to give phosphorus functional groups may contain levels of phosphorus functional groups equivalent to two-phase polymer particles prepared from phosphorus functional monomer.

The two-phase polymer particles may be prepared with either the phosphorus containing groups in the soft polymer phase or the hard polymer phase. Preferably the phosphorus containing groups are located at or near a surface of the two-phase polymer particle.

In another embodiment, the two-phase polymer particles include carboxylic acid groups as chemical groups which provide adsorption to the titanium dioxide particles. The two-phase polymer particles with carboxylic acid groups may be prepared by polymerization of a mixture of ethylenically unsaturated monomers including at least 5 weight % carboxylic acid monomers, based on the weight of the two-phase polymer particles. Examples of carboxylic acid monomers include (meth)acrylic acid, itaconic acid, fumaric acid, maleic acid, maleic anhydride, ethacrylic acid α-chloroacryhc acid, α-vinylacrylic acid, crotonic acid, cinnamic acid, chlorocinnamic acid, β-styrylacrylic acid, β-acryloxypropionic acid, and salts thereof. The carboxylic acid monomer may be included as a polymerized unit in the hard polymer phase or the soft polymer phase, provided the carboxylic acid groups are located at or near a surface of the two-phase polymer particle. The location of the carboxylic acid in the two-phase polymer particle may be determined by electron microscopy using heavy metal salts which complex with the carboxylic acid, as described in M. Joanicot, et al. *Macromolecules* 26, 3168–3175 (1993) and O. L. Shaffer, et al. *Proceedings of the XIIth International Congress for Electron Microscopy*, 426–427, 1990. The two-phase polymer particles may contain from 5 to 15 weight %, preferably 6 to 10 weight %, carboxylic acid monomer, based on the weight of the two-phase polymer particles, as a chemical group which provides adsorption to the titanium dioxide particle.

In another embodiment, the two-phase polymer particles include acid macromonomer as a chemical group to provide adsorption to the titanium dioxide particles. As used herein, acid macromonomer refers to oligomer with a terminal unsaturation and includes monomers with acid groups as polymerized units. The terminal unsaturation and the section of the acid macromonomer with the acid groups, may be attached directly or through a linker group. Suitable acid macromonomers are:

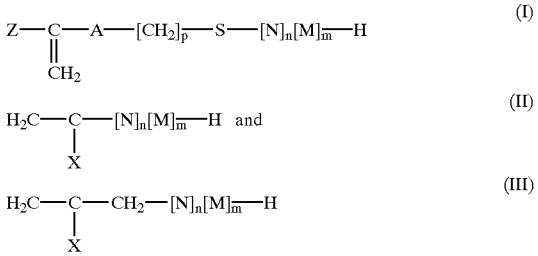

wherein N is the residue of an ethylenically unsaturated carboxylic acid monomer and has the formula:

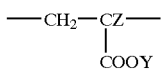

wherein M is the residue of a second ethylenically unsaturated monomer and has the formula

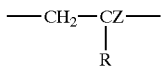

wherein the N and M residues are randomly arranged in the acid macromonomer; wherein m is the total number of M residues in the acid macromonomer and is in the range of 0 to 150; wherein n is the total number of N residues in the acid macromonomer and is in the range of 2 to 300; wherein n is greater than or equal to m; wherein the sum of n and m is in the range of 2 to 300; wherein A is a linker group selected from the group consisting of ester, urethane, amide, amine, and ether linkages; wherein p is in the range of 1 to 20; wherein X is selected from the group consisting of —COOY and R; wherein R is selected from phenyl radicals, substituted phenyl radicals, —CONH$_2$, —CONHR', —CONR'R', —CN, —CCOR', —OCOR', —Cl, and mixtures thereof, wherein R' is an alkyl or alkoxyalkyl radical independently selected from the group consisting of branched, unbranched, or cyclic hydrocarbon radicals having 1 to 18 carbon atoms; wherein Y is independently selected from the group consisting of H, NH$_4$, alkali metals and alkaline earth metals; and wherein each Z is independently selected from the group consisting of H and CH$_3$.

The acid macromonomers may be polymerized from at least one ethylenically unsaturated carboxylic acid monomer and optionally at least one second ethylenically unsaturated monomer. Suitable ethylenically unsaturated carboxylic acid monomers include acrylic acid, methacrylic acid, beta-acryloxypropionic acid, ethacrylic acid, α-chloroacrylic acid, α-vinylacrylic acid, crotonic acid, α-phenylacrylic acid, cinnamic acid, chlorocinnamic acid, and β-styrylacrylic acid. Preferred ethylenically unsaturated carboxylic acid monomers are acrylic acid and methacrylic acid.

The second ethylenically unsaturated monomer includes styrene, vinyltoluene, α-methylstyrene, vinylnaphthalene, vinyl acetate, vinyl versatate, vinyl chloride, (meth)acrylonitrile, (meth)acrylamide, mono-and di-substituted (meth)acrylamide, various ($C_1$–$C_{20}$)alkyl esters of (meth)acrylic acid; for example, methyl (meth)acrylate, ethyl (meth)acrylate, n-butyl (meth)acrylate, isobutyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, n-amyl (meth)acrylate, neopentyl (meth)acrylate, cyclopentyl (meth)acrylate, lauryl (meth)acrylate, oleyl (meth)acrylate, palmityl (meth)acrylate, and stearyl (meth)acrylate; and other (meth)acrylates such as isobornyl (meth)acrylate, benzyl (meth)acrylate, phenyl (meth)acrylate, 2-bromoethyl (meth)acrylate, 2-phenylethyl (meth)acrylate, and 1-naphthyl (meth)acrylate; alkoxyalkyl (meth)acrylate such as ethoxyethyl (meth)acrylate. The acid macromonomers contain as polymerized units from 50 to 100 mole percent ethylenically unsaturated carboxylic acid monomer, preferably from 70 to 100 mole percent, and most preferably from 90 to 100 mole percent of these monomers.

The acid macromonomers may be prepared by various conventional synthetic methods including anionic polymerization as disclosed in U.S. Pat. No. 4,158,736, radical polymerization with chain transfer agents such as cobalt complexes as described in U.S. Pat. No. 5,324,879, catalytic chain transfer polymerization with terminally unsaturated acid macromonomers used as chain transfer agents as described in U.S. Pat. No. 5,362,826, and high temperature radical polymerization as described in U.S. Pat. No. 5,710,227. The terminally unsaturated acid macromonomers of formula I may be prepared by conventional radical polymerization using a hydroxy-functional chain transfer agent such as 2-mercaptoethanol followed by the reaction of the hydroxyl group with an ethylenically unsaturated monomer with a complimentary reactive group to attach the terminal unsaturation. Examples of ethylenically unsaturated monomers with a complimentary reactive group include glycidyl (meth)acrylate, isocyanatoethyl (meth)acrylate, or (meth) acrylic acid. The ethylenically unsaturated monomers with a complimentary reactive group may be attached to the fragment of the hydroxy-functional chain transfer agent by various linkages including ether, urethane, amide, amine, or ester linkages. The acid macromonomers of formulas I, II, and III may be prepared by bulk, solution, and emulsion polymerization using batch, semicontinuous, or continuous processes.

Another method to prepare the acid macromonomers is polymerization of esters of ethylenically unsaturated carboxylic acid monomers such as ethyl acrylate, butyl acrylate, or methyl methacrylate followed by the partial or complete hydrolysis of the ester groups to obtain the carboxylic acid functionalities.

The two-phase polymer particles with acid macromonomer may be prepared by polymerization of a mixture of ethylenically unsaturated monomers including acid macromonomer. The acid macromonomer may be included as a polymerized unit in the hard polymer phase or the soft polymer phase, provide that the polymerized acid monomer is located at or near the surface of the two-phase polymer particle. The two-phase polymer particles may contain from 0.1 to 10 weight %, preferably from 0.5 to 5 weight %, and more preferably from 1 to 3 weight % acid macromonomer, based on the weight of the two-phase polymer particles, as a chemical group which provides adsorption to the titanium dioxide particle.

In another embodiment, the two-phase polymer particles include a water-soluble polymer to provide adsorption to the titanium dioxide particles, the water-soluble compound containing moieties which are adsorbable to the titanium dioxide particles. As disclosed in U.S. Pat. No. 5,412,019, the water-soluble compound may be bonded to the two-phase polymer particles during the polymerization of the two-phase polymer particles, or the water-soluble compound may be bonded to the two-phase polymer particles after polymerization, for example by co-reactive moieties between the two-phase polymer particle and the water-soluble compound.

Suitable water-soluble compounds include polymers with a weight average molecular weight over 1500 such as polymers and copolymers containing as polymerized units, (meth)acrylamide, (meth)acrylic acid, hydroxyalkyl (meth) acrylates, aminoalkyl (meth)acrylates, vinyl pyridine, vinyl pyrrolidone, vinyl and styrene sulphonic acid. Other water-soluble compounds include polymer chains of poly(ethylene imine), poly(ethyoxylate), poly(vinyl alcohol), cellulose ethers such as hydroxyalkyl celluloses (including hydrophobically modified variants), alkylhydroxyalkyl celluloses, carboxyalkyl celluloses, and carboxyalkylhydroxy-alkyl celluloses. Further water-soluble compounds include polymers such as polyesters and polyurethanes or starch derivatives such as acetates, hydroxyalkyl and acroxyalkyl starches or ionic starch derivatives such as phosphate, sulphate, and aminoalkyl, or polysaccharides such as xanthan, guar gum, and gum arabic.

The water-soluble compound may be polymerized in the hard polymer phase or the soft polymer phase, provided that the water-soluble compound is at or near the outer surface of the two-phase polymer particle.

In another embodiment, adsorption of the two-phase polymer particles to the titanium dioxide particle is the attraction between the two-phase polymer particles which have a surface charge of one polarity, and the titanium dioxide particle which has a surface charge of the opposite polarity. As disclosed in U.S. Pat. No. 5,509,960, the composite may be formed by preparing a dispersion of the two-phase polymer particles with either a positive or negative surface charge and a dispersion of titanium dioxide particles with the opposite surface charge, mixing the two dispersions under conditions such that the mixing does not produce a reversal of the sign of the surface charge on one of the particles. The pH values of the dispersions containing the two-phase polymer particles and the titanium dioxide particles may be chosen to obtain particles with the desired sign of surface charge. Preferably, the pH values of the two-phase polymer particle dispersion and the titanium dioxide particle dispersion are similar to simplify the mixing step of the two dispersions. Alternatively, if the two dispersions have different pH values, acid or base may be added during the mixing step to adjust the pH and prevent change in the surface charges of the particles.

The two-phase polymer particles useful in the composite of this invention may be prepared by any process which provides copolymerization of ethylenically unsaturated monomers to prepare two polymer phases such as two-stage emulsion polymerization. Suitable processes include suspension or emulsion polymerization, including for example, the process disclosed in U.S. Pat. Nos. 5,356,968 and 5,264,530. The two-phase polymer particles useful in the composite of this invention may have monomer compositions, particle sizes, and particle size distributions closely related to polymeric latex binders prepared by standard emulsion polymerization techniques known in the art. In addition, the polymer particles useful in the composite of the invention may have an unimodal or a multimodal, including a bimodal, particle size distribution.

Emulsion polymerization techniques for preparing an aqueous dispersion of the two-phase polymer particles from ethylenically unsaturated monomers are well known in the polymer arts, and any conventional emulsion technique for preparing two-phase polymer particles such as multiple stage polymerization processes including two stage polymerization processes. In a two stage polymerization process, a first monomer mixture may be prepared containing ethylenically unsaturated monomers and added to the polymerization vessel. After the complete addition and polymerization of the first monomer mixture to prepare particles of the first polymer phase, a second polymer phase may be prepared by preparing a second monomer mixture containing ethylenically unsaturated monomers, adding the second monomer mixture to the polymerization vessel containing the particles of the first polymer phase, and polymerizing to prepare polymer particles which have a soft polymer phase and a hard polymer phase. In the two stage polymerization process, the first polymer phase may be the soft polymer phase and the second polymer phase may be the hard polymer phase. Alternatively, the first polymer phase may be the hard polymer phase and the second polymer phase may be the soft polymer phase. The two stage polymerization process may also be run as two individual polymerization processes wherein the first polymer phase is prepared in a first polymerization process and at a subsequent time, the second polymer phase is prepared by a second polymerization process in the presence of the first polymer phase. Alternatively, the first and second polymerization processes may be sequential steps in separate reaction vessels. The polymer particles may be prepared using a seed polymer emulsion to control the number of particles produced by the emulsion polymerization of the first phase polymer, as is known in the art. The particle size of the polymer particles may be controlled by adjusting the initial surfactant charge as is known in the art. The preparation of polymeric latex polymers such as the two phase polymer particles is discussed generally in D. C. Blackley, *Emulsion Polymerization* (Wiley, N.Y., 1975). The preparation of acrylic latex polymers is described in, for example, *Emulsion Polymerization of Acrylic Polymers*, Bulletin, Rohm and Haas Company, Philadelphia. Preferably, the two-phase polymer particles are prepared by a polymerization process in an aqueous medium. Preferably, the aqueous polymerization of the two-phase polymer particles containing as polymerized units, ethylenically unsaturated monomers including phosphorus functional monomers, carboxylic acid monomers, or acid macromonomer is conducted at a pH below 5, more preferably at a pH below 4, and most preferably in a pH range of 2 to 4.

A polymerization initiator may be used in carrying out the polymerization of the two-phase polymer particles. Examples of polymerization initiators which may be employed include polymerization initiators which thermally decompose at the polymerization temperature to generate free radicals. Examples include both water-soluble and water-insoluble species. Examples of free radical-generating initiators which may be used include persulfates, such as ammonium or alkali metal (potassium, sodium, or lithium) persulfate; azo compounds such as 2,2'-azobis (isobutyronitrile), 2,2'-azobis(2,4-dimethylvaleronitrile), and 1-t-butyl azocyanocyclohexane; hydroperoxides such as t-butyl hydroperoxide and cumene hydroperoxide; peroxides such as benzoyl peroxide, caprylyl peroxide, di-t-butyl peroxide, ethyl 3,3'-di-(t-butylperoxy) butyrate, ethyl 3,3'-di(t-amulperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates, such as di(1-cyano-1-methylethyl) peroxy dicarbonate; and perphosphates.

Polymerization initiators may be used alone or as the oxidizing component of a redox system, which also includes a reducing component such as ascorbic acid, malic acid, glycolic acid, oxalic acid, lactic acid, thioglycolic acid, or an alkali metal sulfite, more specifically a hydrosulfite, hyposulfite, or metabisulfite, such as sodium hydrosulfite, potassium hyposulfite, and potassium metabisulfite, or sodium formaldehyde sulfoxylate.

The initiator and the optional reducing component may be used in proportions from 0.001% to 5% each, based on the weight of the ethylenically unsaturated monomers in the monomer mixture to be polymerized. Accelerators such as chloride and sulfate salts of cobalt, iron, nickel, or copper may be used in small amounts. Examples of redox catalyst systems include t-butyl hydroperoxide/sodium formaldehyde sulfoxylate/Fe(II), and ammonium persulfatelsodium bisulfite/sodium hydrosulfite/Fe(II). The polymerization temperature may be from room temperature to about 90° C., and may be optimized for the catalyst system employed, as is conventional.

Chain transfer agents may be used to control polymer molecular weight of a polymer phase, if desired. Examples of chain transfer agents include mercaptans, polymercaptans, and polyhalogen compounds. Examples of chain transfer agents which may be used include alkyl mercaptans such as ethyl mercaptan, n-propyl mercaptan, n-butyl mercaptan, isobutyl mercaptan, t-amyl mercaptan, n-hexyl mercaptan, cyclohexyl mercaptan, n-octyl mercaptan, n-decyl mercaptan, n-dodecyl mercaptan; alcohols such as isopropanol, isobutanol, lauryl alcohol, and t-octyl alcohol; halogenated compounds such as carbon tetrachloride, tetrachloroethylene, and trichlorobromoethane. Generally from 0 to 10% by weight, based on the weight of the ethylenically unsaturated monomers in the monomer mixture used to prepare the polymer phase, may be used. The polymer molecular weight may be controlled by other techniques known in the art, such as selecting the ratio of the initiator to ethylenically unsaturated monomer. In the two phase polymer particles of this invention, each polymer phase may have similar molecular weights or may have different molecular weights.

Catalyst and/or chain transfer agent may be dissolved or dispersed in separate or the same fluid medium and gradually added to the polymerization vessel. Ethylenically unsaturated monomer, either neat or dissolved or dispersed in a fluid medium, may be added simultaneously with the catalyst and/or the chain transfer agent. Amounts of initiator or catalyst may be added to the polymerization mixture to "chase" residual monomer after polymerization of the first polymer phase or the second polymer phase has been substantially completed to polymerize the residual monomer as is well known in the polymerization arts.

Aggregation of the two-phase polymer particles is typically discouraged by including a stabilizing surfactant in the polymerization mixture in the polymerization vessel. In general, the growing polymer particles are stabilized during emulsion polymerization by one or more surfactants such as an anionic or nonionic surfactant, or a mixture thereof, as is well known in the polymerization art. Many examples of surfactants suitable for emulsion polymerization are given in *McCutcheon's Detergents and Emulsifiers* (MC Publishing Co., Glen Rock, N.J.), published annually. Other types of stabilizing agents such as protective colloids, may also be used. However, it is preferred that the amount and type of stabilizing surfactant or other type of stabilizing agent employed during the polymerization reaction be selected so that residual stabilizing agent in the aqueous product of the polymerization reaction does not significantly interfere with the properties of coatings containing the composite of this invention which includes the two-phase polymer particles. Further, charged initiator fragments and copolymerized monomer bearing charged functional groups such as copolymerized acid-functional monomer are known to contribute to the stability of the resulting two-phase polymer particles. It is important to note that stabilizing surfactants, copolymerized strongly acidic monomers residual initiator fragments, and the like, may also interfere with the aqueous stability of the composites of this invention. Thus adjusting polymerization condition to provide a desired level of residual initiator fragments and surface acid may be very important in providing two-phase polymer particles for use in the process of the present invention.

The two-phase polymer particles useful in the composite particle of this invention have a weight average molecular weight, Mw, of at least 50,000, preferably of at least 250,000, and most preferably of at least 750,00, as measured by gel permeation chromatography.

The two-phase polymer particles may be prepared as an aqueous dispersion or suspension with a solids level to 70 weight %. The solids level of the two-phase polymer particles prepared by aqueous emulsion polymerization is typically in the range of 20 to 70 weight %, preferably in the range of 35 to 60 weight %. Generally, the two-phase polymer particles are prepared at the highest possible solids level to maximize the reactor output without undue gel formation either during or after polymerization, and provided the viscosity of the aqueous dispersion or suspension is low enough to permit pumping and mixing of the aqueous dispersion or suspension.

Composite particles may be prepared with two-phase polymer particles having average diameters in the range of 20 to 1000 nm. However, for composite particles containing titanium dioxide pigment or other pigments of similar size, maximum hiding power is typically obtained with two-phase polymer particles having average diameters in the range of 40 to 150 nm, preferably in the range of 50 to 125 nm, and more preferably in the range of 60 to 100 nm. The diameter of the two-phase polymer particles is measured by a quasielastic light scattering technique, such as provided, for example, by the Model BI-90 Particle Sizer, of Brookhaven Instruments Corp.

Composite particles may be prepared with the two-phase polymer particles adsorbed to pigment particles such as zinc oxide pigments, antimony oxide pigments, barium pigments, calcium pigments, zirconium pigments, chromium pigments, iron pigments, magnesium pigments, lead pigments, zinc sulfide, lithopone, and phthalo blue. In one embodiment, the composite particles are prepared from clay particles such as kaolin or delaminated clay particles and two-phase polymer particles adsorbed to the clay particles. In another embodiment, the composite particles are prepared from calcium carbonate particles and two-phase polymer particles adsorbed to the calcium carbonate particles. Preferably, the pigment particles are titanium dioxide and more preferably, the pigment particles are rutile titanium dioxide. The pigment particles may be uncoated or coated with a conventional pigment coating.

Titanium dioxide particles are available commercially both in the form of aqueous slurries and as dry pigment, and with a variety of surface treatments, depending on the intended application. Some components of commercially available slurries, such as sodium or ammonium polyelectrolyte dispersants, may inhibit adsorption of the polymer particles on the titanium dioxide particles, as may certain surface treatments. Consequently, the extent and strength of adsorption depends on both the grade and physical form of the titanium dioxide and the identity of the two-phase polymer particles employed.

An aqueous dispersion including the composite particles of this invention may be prepared by first admixing a first aqueous medium containing a dispersion of titanium dioxide particles, a second aqueous medium containing the two-phase polymer particles, and optionally dispersant. Next, the two-phase polymer particles are allowed sufficient time to adsorb to the titanium dioxide particles to form the composite particles of this invention. The adsorption of the two-phase polymer particles to the titanium dioxide particles is believed to be spontaneous and will continue until the two-phase polymer particles are completely adsorbed to the surfaces of the titanium dioxide particles, the surfaces of the titanium dioxide particles are completely covered with two-phase polymer particles, or until an equilibrium is achieved between adsorbed two-phase polymer particles and two-phase polymer particles remaining dispersed in the aqueous medium. The time required for the completion of adsorption may depend upon the titanium dioxide type, the surface treatment of the titanium dioxide particle, dispersant type and concentration, the concentrations of the titanium dioxide particles and the two-phase polymer particles, and temperature. The adsorption may be complete upon admixing of the first aqueous medium and the second aqueous medium, or may require further time. For composites prepared with titanium dioxide particles as the pigment particles, adsorption of the two-phase polymer particles typically required 12 hours for complete adsorption. Mixing the aqueous medium containing the titanium dioxide particles and the two-phase polymer particles may reduce the time for the completion of adsorption. Low levels of other components may be present in the aqueous medium during the formation of the composite particle provided these components do not substantially inhibit or substantially interfere the adsorption of the two-phase polymer particle to the titanium dioxide particle. Examples of other components include cosolvents such as water miscible solvents; wetting agents; defoamers; surfactants; biocides; other copolymers; and other pigments. Preferably the composite particle of this invention is formed in an aqueous medium in the absence of other copolymers and other pigments.

In the preparation of the composite particles of this invention, the first aqueous medium, the second aqueous medium, and optionally the dispersant may be admixed by either adding the first aqueous medium to the second aqueous medium or adding the second aqueous medium to the first aqueous medium. The optional dispersant may be added to the first aqueous medium, the second aqueous medium, or to the mixture of the first aqueous medium and the second aqueous medium. Mixing may be provided to ensure that the titanium dioxide particles and two-phase polymer particles are distributed uniformly in the combined aqueous medium. It is preferred that the first aqueous medium containing the titanium dioxide particle dispersion or slurry is added to the second aqueous medium containing the two-phase polymer particles, rather than visa versa, so that situations in which there is a temporary "excess" of titanium dioxide particles relative to the two-phase polymer particles, and the possibility of grit formation through bridging flocculation of the two-phase polymer particles by the excess of titanium dioxide particles, may be avoided.

An aqueous dispersion including the composite particles of this invention may also be prepared by first preparing a dispersion of two-phase polymer particles in an aqueous medium. Next, the titanium dioxide particles are dispersed in the aqueous medium containing the two-phase polymer particles and optionally dispersant, and the two-phase polymer particles are allowed to adsorb onto the titanium dioxide particles to form the composite particles.

The preparation of the composite particle of this invention includes an optional dispersant. The dispersant may be added at levels which do not inhibit or prevent the adsorption of the two-phase polymer particle to the titanium dioxide particle. The composite particle may be prepared with levels of dispersant in the range of 0 to 2 weight %, preferably 0 to 1 weight %, and more preferably 0 to 0.5 weight %, based on the weight of the titanium dioxide pigment. In one embodiment, the first aqueous medium is prepared with dispersant to aid in the dispersion and stabilization of the titanium dioxide particles. In another embodiment, the composition containing the composite particle of this invention does not contain dispersant. Suitable dispersants include anionic polyelectrolyte dispersants such as copolymerized maleic acid, copolymers including copolymerized acrylic acid, copolymers including copolymerized methacrylic acid, and the like; or carboxylic acids containing molecules such as tartaric acid, succinic acid, or citric acid.

The practice of the process of the present invention may depend on the specific grade of titanium dioxide employed. The present process may be employed to yield improved coating properties with respect to a specific grade of titanium dioxide may be readily determined empirically. Electron microscopy may be employed to observe the composite particle of this invention formed by admixing the first aqueous medium, the second aqueous medium, and optionally, dispersant. Composite particle formation may also be characterized gravimetrically as described in U.S. Pat. No. 6,080,802.

In addition to the composite particles, other components may be added to the composition of this invention depending upon the application of the composition. For example, a second polymer may be included as a binder in a composition suitable as a coating formulation for coating substrates. As used herein, a second polymer refers to polymers which are film forming at application conditions. Suitable second polymers include polymer particles with minimum film formation temperatures at or below the application temperature. Other suitable second polymers include polymer particles with minimum film formation temperatures above the application temperature which may also include coalescents or plasticizers to provide the polymer particles with effective minimum film formation temperatures at or below the application temperature. Other suitable second polymers include water soluble polymers such as acrylic copolymers. Compositions including the composite particle of this invention which are suitable as coating compositions may contain from 0 to 30 weight % second polymer, based on the weight of the composition solids.

In addition, the composition containing the composite particles of this invention may also include other optional components, including without limitation, other polymers, surfactants, extenders, pigments, and dyes, pearlescents, adhesion promoters, crosslinkers, dispersants, defoamers, leveling agents, optical brighteners, UV stabilizers, coalescents, rheology modifiers, preservatives, biocides, and antioxidants. Further, the composition containing the composite particles may also include other pigments, including plastic pigments such as solid bead pigments and microsphere pigments containing voids or vesicles, and inorganic pigments. Examples of solid bead pigments include polystyrene and polyvinyl chloride beads. Examples of microsphere pigments, which include polymer particles containing one or more voids and vesiculated polymer particles, are disclosed in U.S. Pat. Nos. 4,427,835; 4,920,160; 4,594,363; 4,469,825; 4,468,498; 4,880,842; 4,985,064; 5,157,084; 5,041,464; 5,036,109; 5,409,776; and 5,510,422. The levels of composite particles and plastic pigments in the composition may be varied to optimize a particular property in the dried coating, such as hiding, whiteness, gloss, or any combination of properties.

The pH of the composition including the composite particle of this invention may be in the range of 3 to 10. Compositions having composites containing two-phase polymer particles which include phosphorus containing groups, carboxylic acid groups, or acid macromonomer as the chemical groups which provide adsorption to the titanium dioxide particle, preferably have pH values in the range of 7 to 10.

The improved aqueous stability of the composition containing the composite particle and the improved scrub resistance of a coating prepared from this composition provide greater flexibility in preparing aqueous compositions containing the composite particle of this invention. For example, in some cases the use of the present process provides a means for reducing the amount of titanium dioxide pigment required to provide the target opacity. When the composite particles are used in coating formulations, the present method may provide improved coating properties, such as opacity or hiding, heat age resistance of hiding, whiteness, tint strength, mechanical properties, and gloss relative to systems that do not contain the composite particles of this invention. The method also provides coating formulations giving coatings with improved opacity for a given titanium dioxide pigment level.

The composite particles of this invention are particularly useful for improving the performance properties of coatings and paints formed therefrom. Alternatively, the invention offers the ability to formulate coatings and films of substantially equal performance properties as conventional systems but with lower concentrations of expensive titanium dioxide pigment, and accordingly at lower cost. The present invention further contemplates preparing fully formulated aqueous compositions, including aqueous coating compositions, using the composite particles, and the subsequent use of the fully formulated aqueous coating formulation to form products, including coatings and coated articles.

For the preparation of composite particles containing two-phase polymer particles which include phosphorus functional monomer, carboxylic acid monomer, or acid macromonomer as a chemical group which provides adsorption to the titanium dioxide particle, it is preferred that the titanium dioxide slurry is prepared with low levels or, more preferably, without phosphate containing dispersants and surfactants, as these dispersants and surfactants may be difficult to displace from the surface of the titanium dioxide to permit adsorption of the two-phase polymer particle.

The two-phase polymer particles of this invention are preferably selected to provide strong adsorption to the titanium dioxide particles.

The process of the present invention is believed to be dependent to some extent on the relative concentrations and particle sizes of the two-phase polymer particles and the titanium dioxide particles with more two-phase polymer particles being required at a higher concentration of titanium dioxide for optimum performance. Preferably, the two-phase polymer particles are employed at sufficient levels to obtain optimum performance properties in formulation prepared for particular applications.

The concentration of pigment particles including extenders which may be present in the coating formulation is expressed in terms of the pigment volume concentration of the formulation. The pigment volume concentration (hereinafter referred to as the "PVC") of a formulation is defined as the volume amount of inorganic particles, including titanium dioxide and other pigment particles as well as extender particles, present in the formulation, divided by the sum of the volume amount of such inorganic particles plus polymer particle solids in the formulation and expressed herein as a percentage. The composite particles may improve the opacity or hiding of a coating formulated over any PVC range. Preferably, the PVC of coating formulations including the composite particle of the present invention is from 5% to 85%, and more preferably from 10% to 60%.

The composition containing the composite particles of the present invention are preferably used in or as architectural coatings such as interior and exterior house paints, including masonry paints, wood coatings, and treatments; floor polishes; maintenance coatings such as metal coatings; paper coatings; and traffic paints such as those paints used to mark roads, pavements, and runways.

The composition containing the composite particles of the present invention may also be useful for improving the hiding of a coating.

The illustrative examples which follow illustrate the composition and the process of the present invention. These examples will aid those skilled in the art in understanding the present invention; however, the present invention is in no way limited thereby.

The following test methods were employed to evaluate the example compositions:

Composite Stability: Composite stability was evaluated by preparing aqueous dispersions of the composites and allowing the aqueous dispersion to sit for 24 hours. After 24 hours, stable aqueous composite dispersions remained fluid and pourable, and maintained a single phase. Unstable aqueous composite dispersions became highly viscous or formed nonfluid pastes.

Delta Tint Strength Test: Tint strength is a measure of light scattering within the coating, in particular, light scattering by the titanium dioxide particles in the coating. Increased light scattering is observed for coatings containing composite particles which include titanium dioxide particles as the titanium dioxide particles are spaced apart from each other. Coating containing composite particles had increase tint strength, characterized by delta tint strength, compared to control coating which did not contain composite particles. Delta tint strength was measured by first preparing a sample by applying a 0.08 mm (3 mil) thick wet film of the coating formulation onto an opacity chart (Chart 5C, The Leneta Company). The coated samples was allowed to dry at 21° C. and 20% relative humidity for 24 hours. The Y reflectances of the coated samples were measured at a 45°/0° reflection setting with a Pacific Scientific Colorguard (Pacific Scientific). The delta tint strength was calculated by:

$$\text{delta tint strength} = Y_1 - Y_0$$

where $Y_1$ is the Y reflectance for the coated sample including composite particles and $Y_0$ is the Y reflectance for the control coated sample which did not include composite particles. A delta tint strength value greater than zero indicates improved light scattering compared to the control coating which did not contain composite particles. A difference of 0.1 unit or greater was regarded as significant.

Scrub Resistance Test: Coated scrub test panels were prepared by applying films of the coating formulation with a 0.18 mm (7 mil) gap drawdown bar on scrub test panels (#P121-1ON from The Leneta Company). Control coated scrub test panels were also prepared using a control coating formulation which did not contain composite particles. The coated scrub test panels were dried at 21° C. and 50% relative humidity for 7 days. The scrub resistance test was performed using an Abrasion Tester from Gardner Laboratory, according to the following procedure: The coated scrub test panel was placed on a scrub plate with two 6.35 cm brass shims placed 11.4 cm from each other. On a scrub brush was placed 10 ml of Standardized Scrub Medium (The Leneta Company, item # SC-2). The scrub bush was then placed on the coated scrub test panel and 5 ml of water was placed on the coating along the line that the scrub brush will travel during the scrub resistance test. The scrub resistance was evaluated by measuring the number of scrubs required to break through the coating (FB) and the number of scrubs required to remove a line completely across each shim (CL). Two coated scrub test panels were tested for each coating formulation. The scrub ratio (SR) was calculated by:

$$SR = (FB_{1r}/FB^0{}_{1r} + FB_{2r}/FB^0{}_{2r} + FB_{1l}/FB^0{}_{1l} + FB_{2l}/FB^0{}_{2l} + CL_{1r}/CL^0{}_{1r} + CL_{2r}/CL^0{}_{2r} + CL_{1l}/CL^0{}_{1l} + CL_{2l}/CL^0{}_{2l})/8$$

where the subscripts "r" and "l" refer to the right and left shims, respectively, the subscripts "1" and "2" refer to the two coated scrub test panels with each coating, and the superscript "0" refers to the control coated scrub test panel which did not contain composite particles. A scrub ratio greater than unity indicated that the coating had increased scrub resistance compared to the control coating which did not contain composite particles. A difference of 0.05 unit or greater was regarded as significant.

The following abbreviations are used in the examples:

| | |
|---|---|
| AA | acrylic acid |
| D.I. water | deionized water |
| SLS | sodium lauryl sulfate (28% solids) |
| BA | butyl acrylate |
| MMA | methylmethacylate |
| MAA | methacrylic acid |
| PEM | phosphoethyl methacrylate (85% active) |
| ST | styrene |
| ALMA | allyl methacrylate |
| Surfactant | Ethoxylated $C_6$ $C_{18}$ alkyl ethyl sulfate having from 1 to 40 ethylene oxide groups per molecule (30% active in water) |

The two-phase polymer particles of this invention and comparative polymer particles in the following examples were prepared by polymerization in a 5 liter, four necked round bottom flask which was equipped with a paddle stirrer, thermometer, nitrogen inlet, and a reflux condenser.

EXAMPLE 1

Preparation of Two-Phase Polymer Particles by Two Stage Polymerization

The two-phase polymer particles of this invention having a soft polymer phase and a hard polymer phase were prepared by a two stage polymerization using the following procedure: An initial amount D.I. water was added to the flask and heated to 80° C. under a nitrogen atmosphere. Next, a solution containing 10.0 g surfactant in 10.0 D.I. water was added to the flask, followed by the addition of an initiator solution containing 4.8 g sodium persulfate in 50.0 g D.I. water. Immediately after the addition of the initiator solution, a first monomer emulsion, ME I, was feed into the flask at a rate of approximately 12.0 g/min while maintaining the temperature of the reaction mixture at 80° C. After completion of the first monomer emulsion feed, the contents of the flask, were maintained at 80° C. for 10 minutes. Next a second monomer emulsion, ME II, was added to the flask at a rate of approximately 14.0 g/min. After the completion of the second monomer emulsion feed, the resulting dispersion was maintained at 80° C. for 15 minutes and then allowed to cool to 15° C. Next, aqueous ammonia (28%) was added to raise the pH to 8.0 to 10.0. The contents of the flask were filtered to remove any coagulum.

TABLE 1.1

Two-Stage Polymerization of Two-Phase Polymer Particles

| Example | Initial D.I. Water (g) | Monomer Emulsion (I) | Monomer Emulsion (II) |
|---|---|---|---|
| 1.1 | 1000 | 100.0 g D.I. water, 14.4 g surfactant, 398.0 g ST, and 2.0 g MAA. | 110 g D.I. water, 10 g surfactant, 200.0 g BA, 186.2 g MMA, and 14.1 g PEM. |
| 1.2 | 1600 | 200.0 g D.I. water, 24.4 g surfactant, 796.0 g ST, and 4.0 g MAA. | 110 g D.I. water, 10 g surfactant, 200.0 g BA, 185.9 g MMA, and 14.1 g PEM. |
| 1.3 | 1600 | 200.0 g D.I. water, 24.4 g surfactant, 796.0 g ST, and 4.0 g MAA. | D.I. water, 10 g surfactant, 200.0 g BA, 171.8 g MMA, and 28.2 g PEM. |
| 1.4 | 1600 | 200.0 g D.I. water, 24.4 g surfactant, 796.0 g ST, and 4.0 g MAA. | 95.5 g D.I. water, 10 g surfactant, 200.0 g BA, 192.0 g MMA, 2.0 g AA, and 20.5 g of an aqueous solution containing an acid macromonomer of acrylic acid (o-AA, MW~1100) at 29.3 weight % solids. |
| 1.5 | 1600 | 200.0 g D.I. water, 25.0 g surfactant, 796.0 g ST, and 4.0 g MAA. | 100 g D.I. water, 10 g surfactant, 180.0 g BA, 191.8 g MMA, and 28.2 g PEM. |
| 1.6 | 1600 | 200.0 g D.I. water, 25.0 g surfactant, 796.0 g ST, and 4.0 g MAA. | 100 g D.I. water, 10 g surfactant, 164.0 g BA, 207.8 g MMA, and 28.2 g PEM. |
| 1.7 | 1600 | 200.0 g D.I. water, 25.0 g surfactant, 796.0 g ST, and 4.0 g MAA. | 100 g D.I. water, 10 g surfactant, 148.0 g BA, 223.8 g MMA, and 28.2 g PEM. |
| 1.8 | 1600 | 225.0 g D.I. water, 28.2 g surfactant, 895.5 g ST, and 4.5 g MAA. | 75.0 g D.I. water, 7.5 g surfactant, 150.0 g BA, 128.8 g MMA, and 21.2 g PEM. |
| 1.9 | 1600 | 240.0 g D.I. water, 30.0 g surfactant, 955.2 g ST, and 4.8 g MAA. | 60 g D.I. water, 6.0 g surfactant, 120.0 g BA, 103.1 g MMA, and 16.9 g PEM. |
| 1.10 | 1600 | 240.0 g D.I. water, 30.0 g surfactant, 955.2 g ST, and 4.8 g MAA. | 60 g D.I. water, 6.0 g surfactant, 120.0 g BA, 91.8 g MMA, and 28.2 g PEM. |
| 1.11 | 1600 | 250.0 g D.I. water, 31.25 g surfactant, 995.0 g ST, and 5.0 g MAA. | 50 g D.I. water, 5.0 g surfactant, 100.0 g BA, 85.9 g MMA, and 14.1 g PEM. |
| 1.12 | 1600 | 275.0 g D.I. water, 32.8 g surfactant, 1045.75 g ST, and 5.25 g MAA. | 38.0 g D.I. water, 4.0 g surfactant, 75.0 g BA, 64.4 g MMA, and 10.6 g PEM. |
| 1.13 | 1600 | 270 g D.I. water, 34.0 g surfactant, 1084.5 g ST, and 5.45 g MAA. | 27.5 g D.I. water, 2.75 g surfactant, 55.0 g BA, 47.25 g MMA, and 7.75 g PEM. |
| 1.14 | 1600 | 100.0 g D.I. water, 14.4 g surfactant, 88.0 g BA, 271.8 g MMA, 8.0 g ALMA, 4.0 g AA and 28.2 g PEM. | 220 g D.I. water, 20 g surfactant, 400.0 g BA, 392.0 g MMA, and 8.0 g MAA. |
| 1.15 | 1600 | 75.0 g D.I. water, 10.8 g surfactant, 66.0 gBA, 203.8 g MMA, 6.0 g ALMA, 3.0 g AA and 21.2 g PEM. | 250 g D.I. water, 22.5 g surfactant, 450.0 g BA, 441.0 g MMA, and 9.0 g MAA. |
| 1.16 | 1600 | 60.0 g D.I. water, 8.6 g surfactant, 52.8 g BA, 163.0 g MMA, 4.8 g ALMA, 2.4 g AA and 16.9 g PEM. | 265 g D.I. water, 24.0 g surfactant, 480.0 g BA, 470.4 g MMA, and 9.6 g MAA. |
| 1.17 | 1600 | 200.0 g D.I. water, 25.0 g surfactant, 80.0 g BA, 716.0 g ST, and 4.0 g MAA. | 100 g D.I. water, 10 g surfactant, 200.0 g BA, 171.8 g MMA, and 28.2 g PEM. |
| 1.18 | 1600 | 200.0 g D.I. water, 25.0 g surfactant, 144.0 g BA, 652.0 g ST, and 4.0 g MAA. | 100 g D.I. water, 10 g surfactant, 200.0 g BA, 171.8 g MMA, and 28.2 g PEM. |
| 1.19 | 1600 | 200.0 g D.I. water, 25.0 g surfactant, 208.0 g BA, 588.0 g ST, and 4.0 g MAA. | 100 g D.I. water, 10 g surfactant, 200.0 g BA, 171.8 g MMA, and 28.2 g PEM. |

TABLE 1.2

Properties of Two-Phase Polymer Particles Prepared by Two Stage Polymerization

| Example | % Solids | Particle Size (nm) | pH | Tg(I) (° C.) | Tg(II) (° C.) | Wt. Ratio Hard/Soft |
|---|---|---|---|---|---|---|
| 1.1 | 36.4 | 83 | 9.3 | 100 | 6 | 1:1 |
| 1.2 | 35.9 | 87 | 9.1 | 100 | 6 | 2:1 |
| 1.3 | 35.5 | 85 | 8.8 | 100 | 7 | 2:1 |
| 1.4 | 35.9 | 83 | 9.3 | 100 | 4 | 2:1 |
| 1.5 | 35.8 | 88 | 8.6 | 100 | 15 | 2:1 |
| 1.6 | 35.6 | 89 | 8.8 | 100 | 21 | 2:1 |
| 1.7 | 35.5 | 83 | 9.8 | 100 | 28 | 2:1 |
| 1.8 | 35.8 | 89 | 8.8 | 100 | 7 | 3:1 |
| 1.9 | 35.6 | 84 | 8.8 | 100 | 7 | 4:1 |
| 1.10 | 35.7 | 86 | 8.5 | 100 | 9 | 4:1 |
| 1.11 | 36.5 | 91 | 8.5 | 100 | 7 | 5:1 |
| 1.12 | 36.5 | 90 | 8.5 | 100 | 7 | 7:1 |
| 1.13 | 36.5 | 89 | 9.0 | 100 | 7 | 10:1 |
| 1.14 | 35.6 | 78 | 8.8 | 56 | 5 | 1:2 |
| 1.15 | 35.8 | 91 | 9.0 | 59 | 5 | 1:3 |
| 1.16 | 35.4 | 86 | 8.9 | 56 | 5 | 1:4 |
| 1.17 | 35.8 | 82 | 8.8 | 76 | 7 | 2:1 |
| 1.18 | 35.8 | 83 | 8.8 | 58 | 7 | 2:1 |
| 1.19 | 35.6 | 74 | 8.9 | 43 | 7 | 2:1 |

EXAMPLE 2

Preparation of Comparative Polymers One-phase Polymer Particles

Comparative one-phase polymer particles were prepared according to the following procedure: An initial amount D.I. water was added to the flask and heated to 80° C. under a nitrogen atmosphere. Next, a soap solution was prepared and added to the flask, followed by the addition of an initiator solution. Immediately after the addition of the initiator solution, a monomer emulsion (ME) was feed into the flask at a rate of 17.5 g/min while maintaining the temperature of the reaction mixture at 80° C. After completion of the monomer emulsion feed, the contents of the flask, which contained an dispersion, were maintained at 80° C. for 15 minutes and then allowed to cool to 15° C. Next, aqueous ammonia (28%) was added to raise the pH to 8.0 to 10.0. The contents of the flask were filtered to remove any coagulum.

2.1 Polymerization of Comparative One-Phase Polymer Particles

| Example | Initial D.I. Water (g) | Soap Solution Initiator Solution | Monomer Emulsion |
|---|---|---|---|
| Comparative A | 1800 | 11.8 g SLS in 10 g D.I. water. 6.0 g sodium persulfate in 60.0 g D.I. water. | 520.0 g D.I. water, 53.6 g SLS, 330.0 g BA, 1102.1 g MMA, 15.0 g AA, and 52.9 g PEM. |
| Comparative B | 1600 | 10.0 g surfactant in 10.0 D.I. water. 4.8 g sodium persulfate in 50.0 g D.I. water. | 400.0 g D.I. water, 40.0 g surfactant, 384.0 g BA, 761.7 g MMA, 12.0 g AA, and 42.3 g PEM. |
| Comparative C | 1600 | 10.0 g surfactant in 10.0 D.I. water. 4.8 g sodium persulfate in 50.0 g D.I. water. | 400.0 g D.I. water, 40.0 g surfactant, 468.0 g BA, 677.7 g MMA, 12.0 g AA, and 42.3 g PEM. |
| Comparative D | 1600 | 10.0 g surfactant in 10.0 D.I. water. 4.8 g sodium persulfate in 50.0 g D.I. water. | 400.0 g D.I. water, 40.0 g surfactant, 564.0 g BA, 581.7 g MMA, 12.0 g AA, and 42.3 g PEM. |

Comparative two-phase polymer particles were prepared according to the process of Example 1.

TABLE 2.2

Two-Staged Polymerization of Comparative Two-Phase Polymer Particles

| Example | Initial D.I. Water (g) | Monomer Emulsion (I) | Monomer Emulsion (II) |
|---|---|---|---|
| Comparative E | 1600 | 42.0 g D.I. water, 5.3 g surfactant, 169.1 g ST, and 0.9 g MAA. | 255 g D.I. water, 26.0 g surfactant, 515.0 g BA, 442.3 g MMA, and 72.7 g PEM. |
| Comparative F | 1600 | 200.0 g D.I. water, 24.4 g surfactant, 272.0 g BA, 524.0 g ST, and 4.0 g MAA. | 110 g D.I. water, 10 g surfactant, 200.0 g BA, 171.8 g MMA, and 28.2 g PEM. |
| Comparative G | 1600 | 200.0 g D.I. water, 24.4 g surfactant, 304.0 g BA, 492.0 g ST, and 4.0 g MAA. | 110 g D.I. water, 10 g surfactant, 200.0 g BA, 171.8 g MMA, and 28.2 g PEM. |
| Comparative H | 1600 | 200.0 g D.I. water, 24.4 g surfactant, 336.0 g BA, 460.0 g ST, and 4.0 g MAA. | 110 g D.I. water, 10 g surfactant, 200.0 g BA, 171.8 g MMA, and 28.2 g PEM. |

Comparative E is a two-phase polymer particle with a 1:6 weight ratio of hard polymer phase to soft polymer phase.

Comparatives F–H are two-phase polymer particles with a 1:2 weight ratio of two polymer phases in which both polymer phases have Tg's below 40° C.

TABLE 1.1

Properties of Comparative Polymers

| Comparative | Tg (° C.) | Particle Diameter (nm) | pH | Wt. Ratio of 1st Polymer Phase/ 2nd Polymer Phase | % Solids |
|---|---|---|---|---|---|
| A | 55 | 73 | 8.1 | | 37.2 |
| B | 35 | 82 | 8.2 | | 34.8 |
| C | 23 | 80 | 8.7 | | 34.6 |
| D | 10 | 79 | 8.8 | | 34.9 |
| E | 100/7* | 89 | 8.5 | 1:6 | 35.2 |
| F | 28/7* | 71 | 9.6 | 1:2 | 36.1 |
| G | 22/7* | 72 | 9.2 | 1:2 | 36.1 |
| H | 15/7* | 72 | 9.2 | 1:2 | 36.0 |

*Tg of hard polymer phase/Tg of soft polymer phase.

Preparation of Coating Formulations

A coating formulation was prepared according to the following procedure:

A titanium dioxide pigment slurry was prepared by mixing:

| | |
|---|---|
| Water | 44.77 g |
| Colloid ™ 643 defoamer | 3.65 g |
| Tamol ™ 731A dispersant (25% solids) | 7.40 g |
| Ti-Pure ™ R-706 titanium dioxide | 201.94 g |
| Aqueous ammonia (28%) | 1.82 g |

Colloid is a trademark of Rhone-Poulenc Corp. Tamol 731 is a sodium salt of polymeric carboxylic acid, a polycarboxylate dispersant. Tamol is a trademark of Rohm and Haas Company. Ti-Pure is a trademark of Du Pont de Nemours Co. Ti-Pure R-706 is a coatings grade of rutile titanium dioxide. These components were milled on a high speed disk disperser to form a titanium dioxide pigment slurry. The dispersion containing composite particles was prepared by mixing the titanium dioxide pigment slurry into a dispersion containing the two-phase polymer particles and dilution water. The dispersion was allowed to sit for 24 hours prior to the formulation of the coating formulation.

The coating formulation was prepared by admixing the ingredients listed in Table 3.1 to the dispersion containing the composite particles. The latex adsorber in Table 3.1 represents a dispersion containing the two-phase polymer particles, or alternatively, a dispersion containing comparative adsorbing particles for the comparative coating formulations. A control coating formulation, PC-0, was also prepared which did not contain composite particles. The control coating formulation was formulated by admixing the ingredients listed in Table 3.1 with the titanium dioxide pigment slurry. The coating formulations were allowed to sit for 24 hours prior to application. The composite prepared with comparative two-phase polymer particles, Comparative E, was not stable as evidenced by the formation of a solid gel. This prevented the formulation of the coating formulation, PC-E, including the composite containing Comparative E.

EXAMPLE 4

Applications Results

Coatings containing the composite particles of this invention were compared to comparative coatings containing composite particles. The control coating for the delta tint strength and the scrub ratio determinations was a coating which did not contain composite particles.

As groups of coating formulations were evaluated on different days, the control coating formulation, PC-0, which was the comparative basis for the delta tint strength and scrub ratio tests, was remeasured for each group of coating formulations reported in a table.

TABLE 3.1

Coating Formulations

| Coating Formulation | Latex Adsorber | Dilution Water (g) | Black Dye (g) | Water (g) | Binder (g) | Coalescent (g) | Aqueous Ammonia (g) | Rheology Modifier 1 (g) | Rheology Modifier 2 (g) | Water (g) |
|---|---|---|---|---|---|---|---|---|---|---|
| Example 3.1 | 66.65 g Ex. 1.1 | 6.86 | 2.44 | 45.60 | 489.07 | 22.07 | 1.82 | 17.60 | 1.55 | 101.48 |
| Example 3.2 | 88.72 g Ex. 1.1 | 9.15 | 2.44 | 45.60 | 471.64 | 22.07 | 1.82 | 17.60 | 1.55 | 95.09 |
| Example 3.3 | 110.90 g Ex. 1.1 | 11.44 | 2.44 | 45.60 | 454.21 | 22.07 | 1.82 | 17.60 | 1.55 | 88.71 |
| Example 3.4 | 66.91 g Ex. 1.2 | 6.49 | 2.44 | 45.60 | 489.07 | 22.07 | 1.82 | 17.60 | 1.55 | 101.48 |
| Example 3.5 | 68.23 g Ex. 1.3 | 5.17 | 2.44 | 45.60 | 489.07 | 22.07 | 1.82 | 17.60 | 1.55 | 101.48 |
| Example 3.6 | 67.66 g Ex. 1.4 | 5.74 | 2.44 | 45.60 | 489.07 | 22.07 | 1.82 | 17.60 | 1.55 | 101.48 |
| Example 3.7 | 67.66 g Ex. 1.5 | 5.74 | 2.44 | 45.60 | 489.07 | 22.07 | 1.82 | 17.60 | 1.55 | 101.48 |
| Example 3.8 | 68.04 g Ex. 1.6 | 5.36 | 2.44 | 45.60 | 489.07 | 22.07 | 1.82 | 17.60 | 1.55 | 101.48 |
| Example 3.9 | 68.23 g Ex. 1.7 | 5.17 | 2.44 | 45.60 | 489.07 | 22.07 | 1.82 | 17.60 | 1.55 | 101.48 |
| Example 3.10 | 67.66 g Ex. 1.8 | 5.74 | 2.44 | 45.60 | 489.07 | 22.07 | 1.82 | 17.60 | 1.55 | 101.48 |
| Example 3.11 | 68.04 g Ex. 1.9 | 5.36 | 2.44 | 45.60 | 489.07 | 22.07 | 1.82 | 17.60 | 1.55 | 101.48 |
| Example 3.12 | 67.85 g Ex. 1.10 | 5.55 | 2.44 | 45.60 | 489.07 | 22.07 | 1.82 | 17.60 | 1.55 | 101.48 |
| Example 3.13 | 66.36 g Ex. 1.11 | 7.04 | 2.44 | 45.60 | 489.07 | 22.07 | 1.82 | 17.60 | 1.55 | 101.48 |
| Example 3.14 | 66.36 g Ex. 1.12 | 7.04 | 2.44 | 45.60 | 489.07 | 22.07 | 1.82 | 17.60 | 1.55 | 101.48 |
| Example 3.15 | 66.36 g Ex. 1.13 | 7.04 | 2.44 | 45.60 | 489.07 | 22.07 | 1.82 | 17.60 | 1.55 | 101.48 |
| Example 3.16 | 68.04 g Ex. 1.14 | 5.36 | 2.44 | 45.60 | 489.07 | 22.07 | 1.82 | 17.60 | 1.55 | 101.48 |
| Example 3.17 | 67.66 g Ex. 1.15 | 5.74 | 2.44 | 45.60 | 489.07 | 22.07 | 1.82 | 17.60 | 1.55 | 101.48 |
| Example 3.18 | 68.42 g Ex. 1.16 | 4.98 | 2.44 | 45.60 | 489.07 | 22.07 | 1.82 | 17.60 | 1.55 | 101.48 |
| Example 3.19 | 67.66 g Ex. 1.17 | 5.74 | 2.44 | 45.60 | 489.07 | 22.07 | 1.82 | 17.60 | 1.55 | 101.48 |
| Example 3.20 | 67.66 g Ex. 1.18 | 5.74 | 2.44 | 45.60 | 489.07 | 22.07 | 1.82 | 17.60 | 1.55 | 101.48 |
| Example 3.21 | 68.04 g Ex. 1.19 | 5.36 | 2.44 | 45.60 | 489.07 | 22.07 | 1.82 | 17.60 | 1.55 | 101.48 |
| PC-A | 65.29 g Com. A | 8.11 | 2.44 | 45.60 | 489.07 | 22.07 | 1.82 | 17.60 | 1.55 | 101.48 |
| PC-B | 69.60 g Com. B | 3.80 | 2.44 | 45.60 | 489.07 | 22.07 | 1.82 | 17.60 | 1.55 | 101.48 |
| PC-C | 70.01 g Com. C | 3.39 | 2.44 | 45.60 | 489.07 | 22.07 | 1.82 | 17.60 | 1.55 | 101.48 |
| PC-D | 69.40 g Com. D | 4.00 | 2.44 | 45.60 | 489.07 | 22.07 | 1.82 | 17.60 | 1.55 | 101.48 |
| PC-F | 67.10 g Com. F | 6.30 | 2.44 | 45.60 | 489.07 | 22.07 | 1.82 | 17.60 | 1.55 | 101.48 |
| PC-G | 67.10 g Com. G | 6.30 | 2.44 | 45.60 | 489.07 | 22.07 | 1.82 | 17.60 | 1.55 | 101.48 |
| PG-H | 67.28 g Com. H | 6.12 | 2.44 | 45.60 | 489.07 | 22.07 | 1.82 | 17.60 | 1.55 | 101.48 |
| PG-0 | 0 | | 2.44 | 45.60 | 541.37 | 22.07 | 1.82 | 17.60 | 1.55 | 120.63 |

Black dye: Supronil ® HK Black Liquid (Supronil is a trademark of Sandoz Chemical Corporation).
Binder: Rhoplex ® SG-20 (45.5 weight % solids); acrylic copolymer binder (Rhoplex is a trademark of Rohm and Haas Company).
Coalescent: Texanol ® (Texanol is a trademark of Eastman Chemical Company)
Rheology Modifier 1: Acrysol ® RM2020 (Acrysol is a trademark of Rohm and Haas Company)
Rheology Modifier 2: Acrysol ® RM-8W
Aqueous ammonia (28%)

TABLE 4.1

Comparison between Coatings Containing Composites including Two Phase Polymer Particles and One-Phase Polymer Particles

| Coating Formulation | Polymer Type | Hard Tg (° C.) | Soft Tg (° C.) | Wt. Ratio Hard:Soft | Composite Stability | Delta Tint Strength | Scrub Ratio |
|---|---|---|---|---|---|---|---|
| Example 3.1 | 2 phase | 100 | 6 | 1:1 | stable | 1.8 | 1.11 |
| PC-A | 1 phase | 55 | n.a. | n.a. | stable | 1.8 | 0.94 |

The results in Table 4.1 show that composite particles including the two-phase polymer particle of Example 3.1 and the single-phase polymer particle of comparative PC-A formed stable aqueous dispersions and had improved light scattering ability as indicated by delta tinted strength compared to the control coating formulation, PC-0, which did not contain composite particles. Further, the coating containing composite particles of this invention, Example 3.1, which included two-phase polymer particles, had improved scrub resistance compared to the control coating which did not contain composite particles. In contrast, the coating containing composite particles which included single-phase polymer particles had decreased scrub resistance compared to the control coating which did not contain composite particles.

TABLE 4.2

Comparison between Coatings Containing Composites including Two Phase Polymer Particles and One-Phase Polymer Particles

| Coating Formulation | Polymer Type | Hard Tg (° C.) | Soft Tg (° C.) | Wt. Ratio Hard:Soft | Composite Stability | Delta Tint Strength | Scrub Ratio |
|---|---|---|---|---|---|---|---|
| Example 3.10 | 2 phase | 100 | 7 | 3:1 | stable | 1.0 | 1.16 |
| PC-D | 1 phase | n.a. | 10 | n.a. | unstable | 1.3 | 1.13 |
| PC-C | 1 phase | n.a. | 23 | n.a. | unstable | 1.2 | 1.00 |
| PC-B | 1 phase | n.a. | 35 | n.a. | stable | 1.2 | 0.94 |
| PC-A | 1 phase | 55 | n.a. | n.a. | stable | 1.3 | 0.94 |

The results in Table 4.2 shows that the coating containing composite particles of this invention, Example 3.10, which included two-phase polymer particles, provided a combination of forming a stable aqueous dispersion of composite particles and providing a coating with scrub resistance. In comparison, the comparative coatings PC-A and PC-B, which contained composite particles including single phase polymer particles, had decreased scrub resistance compared to the control coating which did not contain composite particles. Further, the comparative titanium dioxide particle dispersions used to prepare comparative coatings PC-C and PC-D were not stable.

Coatings containing composite particles were prepared in which the weight ratio of the two-phase polymer particles to titanium dioxide particles was varied between 12 to 20 parts of the two-phase polymer particles to 100 parts titanium dioxide.

TABLE 4.3

Effect of Weight Ratio of Two-Phase Polymer Particles to Titanium Dioxide Particles on Scrub Ratio

| Coating Formulation | Wt. Ratio of Two-phase Polymer:TiO$_2$ | Polymer Type | Scrub Ratio |
|---|---|---|---|
| Example 3.1 | 12/100 | 2 phase | 1.10 |
| Example 3.2 | 16/100 | 2 phase | 1.10 |
| Example 3.3 | 20/100 | 2 phase | 1.12 |

The results in Table 4.3 showed that coatings containing composites which included 12 to 20 parts two-phase polymer particles to 100 parts titanium dioxide had better scrub ratio resistance than the control coating which did not contain composite particles. Further, the scrub ratio remained nearly constant in this range of two-phase polymer particles to titanium dioxide.

Coating formulation were evaluated containing composite particles which included two-phase polymer particles with several different glass transition temperatures for the soft polymer phase and a hard polymer phase Tg of 100° C. The weight ratio of the hard phase to the soft phase was 2:1.

TABLE 4.4

Effect of Soft Tg of Two Phase Polymer on Stability, Delta Tint Strength, and Scrub Ratio

| Coating Formulation | Soft Tg (° C.) | Composite Stability | Delta Tint Strength | Scrub Ratio |
|---|---|---|---|---|
| Example 3.9 | 28 | stable | 1.9 | 1.12 |
| Example 3.8 | 21 | stable | 2.1 | 1.17 |

TABLE 4.4-continued

Effect of Soft Tg of Two Phase Polymer on Stability, Delta Tint Strength, and Scrub Ratio

| Coating Formulation | Soft Tg (° C.) | Composite Stability | Delta Tint Strength | Scrub Ratio |
|---|---|---|---|---|
| Example 3.7 | 15 | stable | 2.1 | 1.31 |
| Example 3.5 | 7 | stable | 2.2 | 1.28 |

The results in Table 4.4 show that composites of Examples 3.5, 3.7, 3.8, and 3.9 provided stable aqueous dispersions and provided coating with better scrub resistance than the control coating which did not contain composite particles. The tint strength and the scrub ratio increased as the Tg of the soft polymer phase decreased from 28° C. to 7° C.

Coating formulations were evaluated containing composite particles which included two-phase polymer particles with several different glass transition temperatures for the hard polymer phase and a soft polymer phase Tg of 7° C. The weight ratio of the hard phase to the soft phase was 2:1. For the comparative two-phase polymer particles, the weight ratio of the polymer phase with the higher Tg to the polymer phase with the lower Tg was 2:1.

TABLE 4.5

Effect of Hard Tg of Two Phase Polymer on Stability, Delta Tint Strength, and Scrub Ratio

| Coating Formulation | Hard Tg (° C.) | Composite Stability | Delta Tint Strength | Scrub Ratio |
|---|---|---|---|---|
| Example 3.5 | 100 | stable | 1.5 | 1.10 |
| Example 3.19 | 76 | stable | 1.5 | 1.13 |
| Example 3.20 | 58 | stable | 1.7 | 1.09 |
| Example 3.21 | 43 | stable | 1.4 | 1.09 |
| PC-F | 28 | unstable | 1.4 | 1.21 |
| PC-G | 22 | unstable | 1.3 | 1.13 |
| PC-H | 15 | unstable | 1.4 | 1.25 |

The results in Table 4.5 showed that composites of Examples 3.5, 3.19, 3.20, and 3.21 provided stable aqueous dispersions and coatings with better suitable scrub resistance than the control coating which did not contain composite particles. In contrast, the comparative composites containing two-phase polymer particles in which both polymer phase had glass transition values below 40° C. did not provide stable aqueous dispersions.

Coating formulations were evaluated containing composite particles which included two-phase polymer particles with several different weight ratios of the hard polymer phase to the soft polymer phase. The Tg of the hard polymer phase was 100° C. and the Tg of the soft polymer phase was 7° C.

TABLE 4.6

Effect of the Ratio of the Hard Polymer Phase to the Soft Polymer Phase on the Coating Properties

| Coating Formulation | Hard Phase: Soft Phase Ratio | Composite Stability | Delta Tint Strength | Scrub Ratio |
|---|---|---|---|---|
| Example 3.15 | 10:1 | stable | 1.3 | 1.21 |
| Example 3.14 | 7:1 | stable | 1.4 | 1.21 |
| Example 3.13 | 5:1 | stable | 1.5 | 1.19 |
| Example 3.10 | 3:1 | stable | 2.0 | 1.28 |
| Example 3.5 | 2:1 | stable | 2.2 | 1.20 |
| Composite including Com-E | 1:6 | unstable | n.a. | n.a. |

The results in Table 4.6 showed that the composite particles of Examples 3.15, 3.14, 3.13, and 3.10 provided stable aqueous dispersions and provided coating with better suitable scrub resistance than the control coating, PC-0. The comparative composite particles which included Comparative E, a two-phase polymer particle with a ratio of hard polymer phase to soft polymer phase outside the range of this invention, did not form a stable aqueous dispersion.

Coating formulations were evaluated containing composite particles which included two-phase polymer particles with weight ratios of the hard polymer phase to the soft polymer phase in the range of 2:1 to 1:4. The Tg of the soft polymer phase was approximately 6° C.

TABLE 4.7

Effect of the Ratio of the Hard Polymer Phase to the Soft Polymer Phase on the Coating Properties

| Coating Formulation | Polymer Type | Hard Tg (° C.) | Soft Tg (° C.) | Wt. Ratio Hard:Soft | Composite Stability | Delta Tint Strength | Scrub Ratio |
|---|---|---|---|---|---|---|---|
| Example 3.5 | 2 phase | 100 | 7 | 2:1 | stable | 1.6 | 1.53 |
| Example 3.16 | 2 phase | 56 | 5 | 1:2 | stable | 1.8 | 1.38 |
| Example 3.17 | 2 phase | 59 | 5 | 1:3 | stable | 1.8 | 1.42 |
| Example 3.16 | 2 phase | 56 | 5 | 1:4 | stable | 1.9 | 1.38 |
| PC-A | 1 phase | 55 | n.a. | n.a. | stable | 1.6 | 1.13 |

In the results in Table 4.7, the control coating, which did not contain composite particles, had lower scrub resistance than other samples of the control coating. Consequently, the calculated values for the scrub ratio are skewed higher. The results in Table 4.7 show that the composite particles with ratios of hard polymer phase to soft polymer phase in the range of 2:1 to 1:4 provided stable aqueous dispersions. Further these composite particles provided coatings with improved scrub resistance compared to a coating containing composite particles including one-phase polymer particles. The coatings containing composite particles had increased light scattering compared to the control coating, as indicated by the delta tint strength values.

Coating formulations were evaluated containing composite particles having two-phase polymer particles which included several levels of phosphorus-functional monomer as a polymerized group and a coating formulation containing composite particles having two-phase polymer particles which include acid macromonomer as a polymerized group.

improved scrub resistance compared to a coating containing composite particles including one-phase polymer particles, as exemplified by PC-A.

We claim:

1. A composition comprising at least one composite particle;

wherein said composite particle comprises:
 a) a titanium dioxide particle; and
 b) two-phase polymer particles adsorbed on the surface of said titanium dioxide particle;

wherein said composite particle is formed in an aqueous mixture consisting essentially of at least one said titanium dioxide particle, a multiplicity of said two-phase polymer particles, and optionally, dispersant, and the weight ratio of said multiplicity of said two-phase polymer particles to at least one said titanium dioxide

TABLE 4.8

Effect of Type and Level of Chemical Group to Provide Adsorption to Titanium Dioxide

| Coating Formulation | Polymer Type | Hard Tg (° C.) | Soft Tg (° C.) | Wt. Ratio Hard:Soft | Acid Group | Composite Stability | Delta Tint Strength | Scrub Ratio |
|---|---|---|---|---|---|---|---|---|
| Example 3.5 | 2 phase | 100 | 7 | 2:1 | 2% PEM | stable | 1.0 | 1.06 |
| Example 3.4 | 2 phase | 100 | 6 | 2:1 | 1% PEM | stable | 0.3 | 1.11 |
| Example 3.6 | 2 phase | 100 | 4 | 2:1 | 1.5% o-AA | stable | 0.4 | 1.08 |
| PC-A | 1 phase | 55 | n.a. | n.a. | 3% PEM | stable | 0.4 | 0.92 |

The results in Table 4.8 show that the composite particles which include two-phase polymer particles including PEM and o-AA as a polymerized group, as exemplified by Examples 3.4–3.6, provided a combination of stable aqueous dispersions, coatings with increased light scattering compared to the control coating which did not contain composite particles, and improved scrub resistance compared to a coating containing composite particles including one-phase polymer particles, as exemplified by PC-A.

particle in said aqueous mixture is in the range of 1:20 to 1:2;

wherein each of said two-phase polymer particles, which contain ethylenically unsaturated monomer as polymerized units, comprises:
 i) a soft polymer phase with a glass transition temperature less than or equal to 40° C., and
 ii) a hard polymer phase with a glass transition temperature greater than 40° C.;

TABLE 4.9

Effect of Phosphorus-Functional Monomer Level

| Coating Formulation | Polymer Type | Hard Tg (° C.) | Soft Tg (° C.) | Wt. Ratio Hard:Soft | Acid Group | Composite Stability | Delta Tint Strength | Scrub Ratio |
|---|---|---|---|---|---|---|---|---|
| Example 3.4 | 2 phase | 100 | 6 | 2:1 | 1% PEM | stable | 1.3 | 1.17 |
| Example 3.11 | 2 phase | 100 | 7 | 4:1 | 1.2% PEM | stable | 1.4 | 1.20 |
| Example 3.12 | 2 phase | 100 | 9 | 4:1 | 2% PEM | stable | 1.6 | 1.15 |
| PC-A | 1 phase | 55 | n.a. | n.a. | 3% PEM | stable | 1.8 | 0.93 |

The results in Table 4.9 show that the composite particles which contain two-phase polymer particles including 1 to 2 weight % PEM as a polymerized unit, provided stable aqueous dispersions of composite particles, and provided coatings with increased light scattering compared to a control coating which did not contain composite particles and wherein the difference between the glass transition temperature of said hard polymer phase and said soft polymer phase is at least 10° C.;
wherein the average weight ratio of said hard polymer phase to said soft polymer phase is in the range of 10:1 to 1:5; and wherein
- A) each of said two-phase polymer particles includes at least one element selected from the group consisting of:
  - at least one phosphorus functional monomer as a polymerized group,
  - at least 5 weight % of at least one carboxylic acid monomer as a polymerized group, based on weight of said two-phase polymer particles,
  - at least one acid macromonomer as a polymerized group, and
  - a water soluble polymer chemically bonded to said two-phase polymer particles wherein said water soluble polymer has a molecular weight of at least 1500 prior to bonding to said two-phase polymer particles and contains at least one moiety adsorbable to said titanium dioxide particle; or
- B) said two-phase polymer particles and said titanium dioxide particle have opposite charges.

2. The composition according to claim 1 wherein said two-phase polymer particles comprise as polymerized units, at least one phosphorus functional monomer.

3. The composition according to claim 1 wherein said two-phase polymer particles comprise as polymerized units, at least 5% weight of at least one carboxylic acid monomer, based on weight of said two-phase polymer particles.

4. The composition according to claim 1 wherein said two-phase polymer particles are prepared by an aqueous emulsion polymerization process including at least two polymerization stages.

5. The composition according to claim 1 wherein said two-phase polymer particles have an average diameter in the range of 30 to 200 nm.

6. A process for preparing a stable aqueous dispersion of composite particles comprising the steps of:
- a) dispersing titanium dioxide particles in a first aqueous medium;
- b) preparing a dispersion or suspension of two-phase polymer particles in a second aqueous medium, wherein said two-phase polymer particles, which contain ethylenically unsaturated monomer as polymerized units, comprise:
  - i) a soft polymer phase with a glass transition temperature less than or equal to 40° C., and
  - ii) a hard polymer phase with a glass transition temperature greater than 40° C.;

wherein the difference between the glass transition temperature of said hard polymer phase and said soft polymer phase is at least 10° C.; wherein the average weight ratio of said hard polymer phase to said soft polymer phase is in the range of 10:1 to 1:5; and wherein
  - A) each of said two-phase polymer particles includes at least one element selected from the group consisting of:
    - at least one phosphorus functional monomer as a polymerized group,
    - at least 5 weight % of at least one carboxylic acid monomer as a polymerized group, based on weight of said two-phase polymer particles,
    - at least one acid macromonomer as a polymerized group, and
    - a water soluble polymer chemically bonded to said two-phase polymer particles wherein said water soluble polymer has a molecular weight of at least 1500 prior to bonding to said two-phase polymer particles and contains at least one moiety adsorbable to said titanium dioxide particle; or
  - B) said two-phase polymer particles and said titanium dioxide particle have opposite charges;
- c) preparing a mixture consisting essentially of said first aqueous medium, said second aqueous medium, and optionally, dispersant, wherein the average weight ratio of said two-phase polymer particles to said titanium dioxide particles is in the range of 1:20 to 1:2; and
- d) permitting adsorption of said two-phase polymer particles to said titanium dioxide particles to form said stable aqueous dispersion of composite particles.

7. The process according to claim 6 wherein said two-phase polymer particles comprise as polymerized units, at least one phosphorus functional monomer.

8. The process according to claim 6 wherein said two-phase polymer particles comprise as polymerized units, at least 5% weight of at least one carboxylic acid monomer, based on weight of said two-phase polymer particles.

9. The process according to claim 6 wherein said two-phase polymer particles are prepared by an aqueous emulsion polymerization process including at least two polymerization stages.

10. The process according to claim 6 wherein said two-phase polymer particles have an average diameter in the range of 30 to 200 nm.

11. The composition according to claim 1 wherein said ethylenically unsaturated monomer is selected from the group consisting of monoethylenically unsaturated monomers, multiethylenically unsaturated monomers, functional monomers, and mixtures thereof.

12. The composition according to claim 1 wherein said two-phase polymer is prepared by emulsion polymerization of ethylenically unsaturated monomers.

13. The process of according to claim 6 wherein said ethylenically unsaturated monomer is selected from the group consisting of monoethylenically unsaturated monomers, multiethylenically unsaturated monomers, functional monomers, and mixtures thereof.

14. The process according to claim 6 wherein said two-phase polymer is prepared by emulsion polymerization of ethylenically unsaturated monomers.

* * * * *